US009353775B2

(12) United States Patent
Young

(10) Patent No.: US 9,353,775 B2
(45) Date of Patent: May 31, 2016

(54) CYLINDRICAL LINER FOR PISTON ACTUATOR

(71) Applicant: Safoco, Inc., Houston, TX (US)

(72) Inventor: Terry Glenn Young, Longview, TX (US)

(73) Assignee: Safoco, Inc., Houston, TX (US)

( * ) Notice: Subject to any disclaimer, the term of this patent is extended or adjusted under 35 U.S.C. 154(b) by 521 days.

(21) Appl. No.: 13/648,595

(22) Filed: Oct. 10, 2012

(65) Prior Publication Data

US 2014/0096676 A1    Apr. 10, 2014

(51) Int. Cl.
| | |
|---|---|
| *F16K 31/44* | (2006.01) |
| *F15B 15/14* | (2006.01) |
| *F16J 10/04* | (2006.01) |
| *F15B 21/00* | (2006.01) |
| *F16K 31/122* | (2006.01) |
| *F16K 3/02* | (2006.01) |
| *F15B 15/02* | (2006.01) |

(52) U.S. Cl.
CPC ......... *F15B 15/1452* (2013.01); *F15B 15/1428* (2013.01); *F15B 15/1447* (2013.01); *F15B 21/003* (2013.01); *F16J 10/04* (2013.01); *F16K 3/0254* (2013.01); *F16K 31/122* (2013.01); *F15B 15/02* (2013.01); *F15B 2211/7052* (2013.01); *F15B 2211/76* (2013.01); *Y10T 29/49249* (2015.01)

(58) Field of Classification Search
CPC .............................. F16J 10/04; F15B 15/1452
USPC .................... 92/59, 169.2, 171.1, 51
See application file for complete search history.

(56) References Cited

U.S. PATENT DOCUMENTS

| | | | |
|---|---|---|---|
| 767,526 A * | 8/1904 | Paulson | 92/171.1 |
| 3,608,912 A | 9/1971 | Templin | |
| 3,896,835 A | 7/1975 | Wicke | |
| RE29,322 E | 7/1976 | Nelson | |
| 4,129,283 A | 12/1978 | Taylor | |
| 4,135,547 A | 1/1979 | Akkerman et al. | |
| 4,157,167 A | 6/1979 | Akkerman | |
| 4,271,857 A | 6/1981 | Rowe | |
| 4,372,333 A | 2/1983 | Goans | |
| 4,562,799 A * | 1/1986 | Woods et al. | 123/193.2 |
| 4,568,058 A * | 2/1986 | Shelton | 251/62 |
| 4,585,207 A | 4/1986 | Shelton | |
| 4,682,757 A | 7/1987 | Shelton | |
| 4,937,927 A * | 7/1990 | Taipale | 29/888.061 |
| 5,067,510 A | 11/1991 | Breaux et al. | |
| 6,015,134 A | 1/2000 | Johnson | |
| 6,209,445 B1 * | 4/2001 | Roberts et al. | 92/128 |
| 2002/0139948 A1 * | 10/2002 | Hademenos et al. | 251/63.6 |

(Continued)

OTHER PUBLICATIONS

Axelson, "Manumatic" Diaphragm Gate Valve Actuator, (dated 1985 according to opposing counsel in pending litigation).

(Continued)

*Primary Examiner* — Nathaniel Wiehe
*Assistant Examiner* — Dustin T Nguyen
(74) *Attorney, Agent, or Firm* — Bushman Werner, P.C.

(57) ABSTRACT

Disclosed herein are new types of hydraulic piston valve actuators wherein the piston is replaceable with different sized pistons. Further disclosed are parts of the piston interchange system resulting in the fewest number of parts changed between one piston diameter and another piston diameter. Methods of changing from one piston diameter to another piston diameter are also disclosed.

11 Claims, 3 Drawing Sheets

(56) References Cited

U.S. PATENT DOCUMENTS

2011/0168109 A1* 7/2011 Roth .................... 123/41.84
2012/0107144 A1* 5/2012 Keifer ..................... 417/53
2013/0020519 A1* 1/2013 Lymberopoulos ............ 251/213

OTHER PUBLICATIONS

W-K-M Surface Safety System; Cooper Industries; Flow Control; Catalog S, Issue 5, Copyright 1989; (pp. 1-24).

Cameron; Oil Tool Products 1970-1971; Automatic Safety Valve; (pp. 2); (Undated).

LCR Actuator; Operating Manual for Cameron LC ROCS-1 Actuators Which Meet ANSI/ASME SPPE-1 and API Specification 14D Requirements; Cameron Iron Works, Inc.; SD-1627; Mar. 1971; (pp. 1-21).

Description of Cameron Type "A" Fail-Safe Valve; Cooper Iron Works, Inc., Engineering Bulleting No. 170; Dec. 5, 1969; (pp. 1-7).

Baker CAC, Inc.; Bonnet Assembly; Unite No. 880-66-7341; Jun. 15, 1999; (pp. 1).

McEvoy-Willis; Surface Safety Valve (SSV) Hydraulic Actuator; Catalog No. 103-A; Feb. 1987; (pp. 8).

Cameron Oil Tool Division; Gate Valves; Cameron Iron Works, Inc. 1997; (pp. 7).

Cameron Iron Works, Inc.; LCR and HLCR Actuators and Accessories, 1986-1987 General Catalog; (pp. 2).

Cameron Iron Works, Inc.; Cameron Automatic Safety Valves; Cameron Oil Products 1972-1973; (pp. 3).

Cameron Iron works, Inc.; Cameron Gate Valve Products; (Undated); (pp. 1312-1342).

Gray Tool Company; Graysafe(TM) Hydraulic and Pneumatic Actuators, (Apr. 1981) 10m 10/820.

Axelson Incorporated; Condensed Catalog, (pp. ICC 0001417-ICC-0001442); pre 1982.

* cited by examiner

CYLINDRICAL LINER FOR PISTON ACTUATOR

FIELD

The present invention relates to methods and devices pertaining to interchangeability of pistons on pneumatic or hydraulic valve actuators. More specifically, the present invention relates to methods and devices for increasing or decreasing the surface area of an actuator piston.

BACKGROUND

Actuators to open and close gate valves for high pressure uses may include manual operators, diaphragm-type operators, hydraulic operators or pneumatic operators. Typically, such actuators include a bonnet assembly which connects a gate valve body, a valve gate and a bonnet stem to the actuator body. Still further an operator is connected to the gate and associates with the actuator to open or close the gate valve. The operator typically has a maximum force capability for applying to the bonnet stem. It is sometimes desirable to change the opening/closing power of an actuator for different gate valve operations involving different fluids at different pressures without having to remove the actuator itself.

Regarding gate valves, these valves are generally comprised of a valve body having a central axis aligned with inlet and outlet passages, and a space between the inlet and outlet passages in which a slide, or gate, may be moved perpendicular to the central axis to open and close the valve. In the closed position, the gate surfaces typically seal against sealing rings which surround the fluid passage through the valve body. Gate valves have been used for centuries to control the flow of a great variety of fluids. Often the fluid to be controlled by the gate valve is under pressure. In the petroleum industry, gate valves are used along piping at various locations, and in particular are used in piping referred to in the petroleum industry as a Christmas tree, which is used as part of a drilling operation.

Hydraulic actuators typically incorporate a single piston and cylinder to produce a force in pounds per foot or kilograms per meter to open or close a gate valve. Typically the media used in hydraulic actuators is a standard hydraulic fluid, although other fluids may be used in particular applications. Many hydraulic actuator producers will designate optimum parameters for piston applications to cover the complete size range of gate valves. However, certain markets require specific pressures and volumes to be utilized. By adding or subtracting the diametrical size of the piston, the volumes and pressure can be increased or decreased.

Given the range of pressures and volumes that are required for different valve actuation using a hydraulic piston actuator, it would be advantageous to develop an actuator capable of switching piston diameters without swapping out hydraulic actuators on a given gate valve. Additionally, by switching out pistons on a hydraulic actuator companies could save money and resources by creating a single hydraulic actuator with interchangeable parts.

SUMMARY

Certain embodiments of the invention pertain to a hydraulic actuator comprising a top plug having at least one inlet port, the top plug having a proximal side with an inlet port bore in fluid connection with the inlet port, the top plug further defining a central axis in a distal to proximal direction. Additionally, in this embodiment, the actuator includes an actuator housing centered along the central axis and proximally connected to the top plug, the actuator housing having an inner diameter and an inward facing wall; and a piston sleeve having a distal end and a proximal end, the piston sleeve further having an inner diameter and an inward facing wall and an outer diameter and an outer diameter and an outward facing wall, the outward facing wall abutting the inward facing wall of the actuator housing. Still further, the actuator of this embodiment possesses a piston having a diameter an outward facing wall, a proximal side and a distal side, the outward facing wall abutting or about abutting the inward facing wall of the piston sleeve; a downstop having a distal side and a proximal side, the distal side abutting the proximal side of the piston and the proximal side abutting a central spring and connected to an operator shaft having a distal end and a proximal end; and a gate valve, the gate connected to the proximal end of the gate valve.

In the aforementioned embodiment, the piston sleeve is replaceable with a different piston sleeve having a different inner diameter and the piston is replaceable with a different piston having a different diameter, the outward facing wall of the different piston abutting the inward facing wall of the piston sleeve.

In further embodiments of the invention pertaining to the top plug, the top plug may have at least one inlet port for hydraulic fluid. In still further embodiments of the invention concerning the top plug, the distal end of the piston sleeve may abut the proximal side of the top plug. In still further embodiments, the top plug is affixed to the actuator by bolts. In yet more aspects of the invention concerning the top plug, the top plug further may further comprise at least one sealing groove adapted to receive at least one top plug seal on the proximal side of the top plug, and wherein when at least one top plug seal abuts the distal end of the piston sleeve.

In certain further embodiments of the invention, the top plug and the aforementioned piston sleeve are adapted to receive an actuator top shaft, the top shaft having a proximal end connected to the distal side of the piston.

Still further, in embodiments of the aforementioned invention, concerning the piston sleeve, the proximal end of the piston sleeve may abut a retainer ledge. In such embodiments, the piston sleeve may be said to be retained from movement in a proximal direction by the retainer ledge and from movement in a distal direction by the proximal side of the top plug.

Alternatively or additively, the hydraulic actuator may comprise a threaded interface wherein the inward facing wall of the actuator housing is threaded and adapted to receive the piston sleeve having a threaded outward facing wall. In such embodiments, the threaded interface may retain the piston sleeve and prevent movement in a proximal or distal direction without rotating the piston sleeve and thereby screwing it in further proximally or unscrewing it further distally.

In further aspects of the embodiments of the invention, an inlet port of the top plug may be aligned with a hydraulic fluid port on the distal end of the piston sleeve.

Further, concerning the embodiments of the invention regarding hydraulic fluid of a hydraulic actuator, the hydraulic fluid may enter the inlet port under pressure and form a hydraulic piston chamber that is proximal to the top plug and distal to the piston.

In further embodiments of the invention concerning the piston sleeve the outer diameter of any piston sleeve is generally the same. Likewise, the inner diameter of the actuator housing may remain constant regardless of piston sleeve selection.

Other embodiments of the invention disclosed herein pertain to a method of increasing the surface area of a piston of a hydraulic actuator, the method comprising: 1) obtaining a hydraulic actuator, removing the top plug from the actuator housing; 2) removing the piston sleeve from the actuator; 3) removing the piston from the actuator; 4) obtaining a different piston sleeve with a different inner diameter; 5) obtaining a different piston with a diameter equal to the inner diameter of the different piston sleeve; 6) inserting the different piston sleeve and different piston into the actuator with the proximal end the piston sleeve and the proximal side of the piston being inserted toward the proximal end of the actuator housing; and 7) reattaching the top plug to the actuator housing. In this embodiment, the actuator itself may comprise: 1) a top plug having an inlet port in fluid connection to a hydraulic chamber, the top plug further having a proximal side; 2) an actuator housing with a distal end capable of being affixed to the top plug and a proximal end oriented away from the top plug, the actuator housing having an inward facing wall with an inner diameter; 3) a piston sleeve having a distal end and a proximal end, the piston sleeve further having an inner diameter and an inward facing wall and an outer diameter and an outer diameter and an outward facing wall, the outward facing wall abutting the inward facing wall of the actuator housing; and a piston having a diameter an outward facing wall, a proximal side and a distal side, the outward facing wall abutting or about abutting the inward facing wall of the piston sleeve.

In such embodiments of the method of the invention, the method may further include the concept of removing and reattaching the top plug to the actuator by unscrewing or screwing in a plurality of bolts traversing through both the top plug and the actuator housing.

In further embodiments concerning the method, the piston sleeve may have a distal end with at least one hydraulic fluid port in fluid communication with at least one inlet port on the top plug. Alternatively, the piston sleeve may not have a hydraulic fluid port.

In further embodiments concerning the method, inserting the different piston sleeve may comprise inserting the piston sleeve in a proximal direction until the proximal end of the piston sleeve abuts a sleeve retaining ledge on the inward facing wall of the actuator housing.

In further other embodiments concerning the method inserting the different piston sleeve may comprise screwing a piston sleeve into the actuator housing in a proximal direction, wherein the inward facing wall is threaded and adapted to receive threading on the outward facing wall of the piston sleeve.

In still further embodiments concerning the method, the piston sleeve is replaceable with a different piston sleeve having a different inner diameter and the piston is replaceable with a different piston having a different diameter, the outward facing wall of the different piston abutting the inward facing wall of the piston sleeve.

Figure 1:
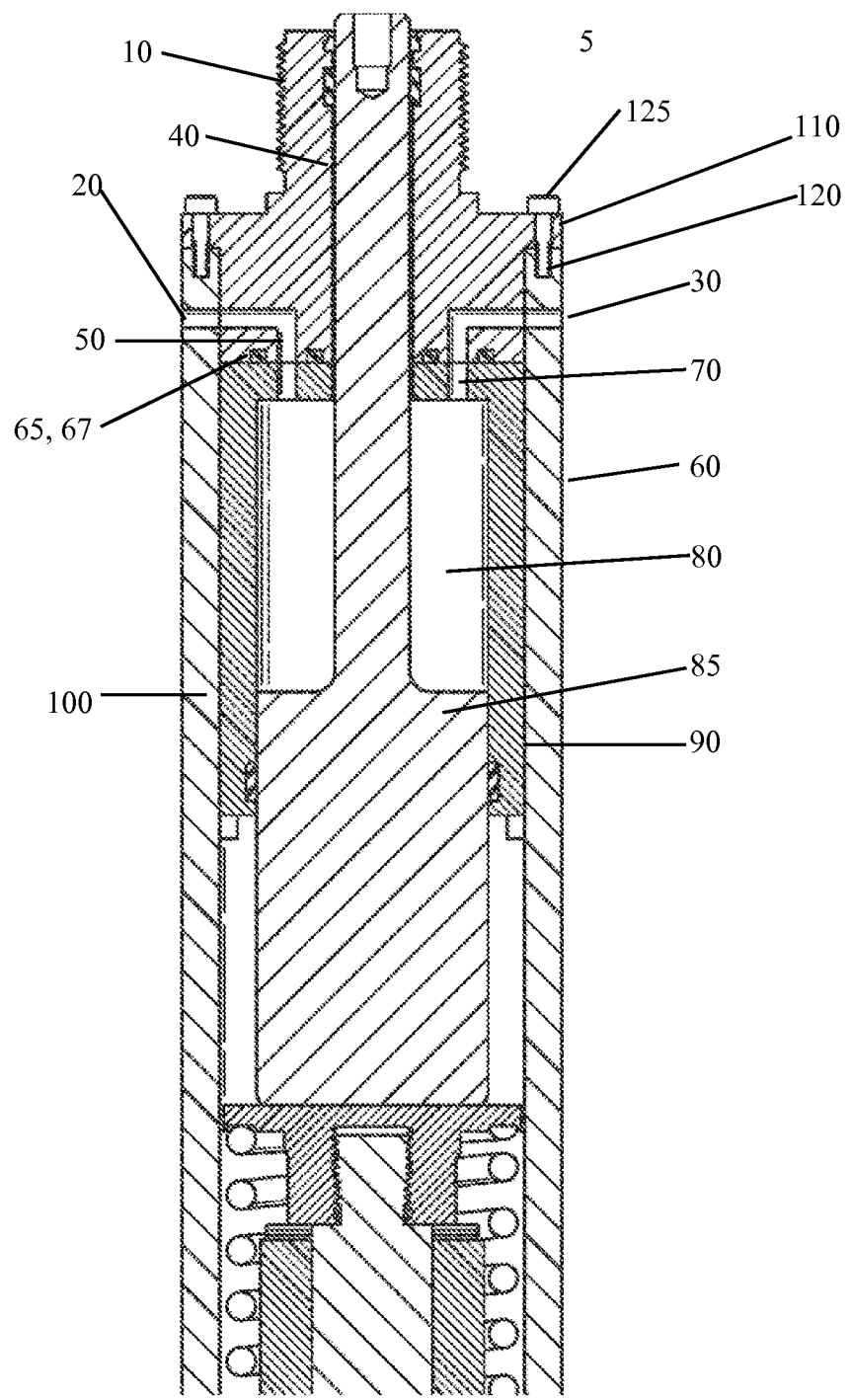
FIG. 1 is a cross sectional illustration of an actuator of the present invention comprising a piston sleeve with hydraulic fluid ports.

LIST OF REFERENCE NUMERALS hydraulic actuator 5
top plug 10
outlet port 20
inlet port 30
top shaft bore 40
inlet port bore 50
piston sleeve 60
sealing grooves 65
top plug seals 67
hydraulic fluid port 70
hydraulic piston chamber 80
piston 85
piston sleeve outward facing wall 90
actuator housing 100
vertical bores 110
vertical threaded bores 120
bolts 125
piston sleeve wall 130
topless piston sleeve 140
sleeve retaining ledge 150
piston sleeve sealing grooves 160
piston sleeve seals 170
downstop 180
centered threaded bore 190
operator shaft 200
central spring 210
bonnet ring 220
bonnet 230
packing retainer 240
drift shims 250
central packing retainer bore 260
valve body 270
gate 280
flow axis 290

DETAILED DESCRIPTION

Introduction

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings making apparent to those skilled in the art how the several forms of the invention may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3rd Edition.

Distal, in certain instances, can be defined as toward the top of the actuator and away from any valve on which the actuator rests.

Proximal, in certain instances, can be defined as toward a valve on which an actuator is mounted and away from the top of the actuator.

Outward or outwardly, in certain instances, can be defined as away from a central axis in a direction substantially perpendicular to such a central axis.

As used herein, the term "conduit" means and refers to a fluid flow path.

As used herein, the term "line" means and refers to a fluid flow path.

As used herein, the term "fluid" refers to a non-solid material such as a gas, a liquid or a colloidal suspension capable of being transported through a pipe, line or conduit. Examples of fluids include by way of non-limiting examples the following: natural gas, propane, butane, gasoline, crude oil, mud, water, nitrogen, sulfuric acid and the like.

As used herein, the term "attached," or any conjugation thereof describes and refers to the at least partial connection of two items.

EMBODIMENTS

It is contemplated that in certain embodiments of the invention disclosed herein, a hydraulic actuator is disclosed comprising a top plug having at least one outlet port with a plug such as a pressure relief valve the top plug also has an inlet port for receiving a pressure fluid. The top plug in this embodiment has a proximal side comprising a top shaft bore and at least one inlet port bore. In the aforementioned embodiment, the proximal side of the top plug may abut the distal side of a piston sleeve. In such embodiments, the proximal side of the top plug may possess one or more sealing grooves which may contact the distal end of the piston sleeve. Within the sealing grooves are seals, such as polypack seals or o-rings which prevent the escape of hydraulic fluid. The piston sleeve possesses at least one hydraulic fluid port running from the distal side of the piston sleeve to the proximal side of the piston sleeve to a hydraulic piston chamber. The hydraulic piston chamber has a distal side comprising the proximal side of the piston sleeve and a proximal side comprising the distal side of the piston. The hydraulic piston chamber also has a lateral side comprising the inward facing wall portion of the piston sleeve.

In this embodiment, the piston sleeve has an outward facing wall abutting or almost abutting an inward facing wall of the actuator housing. When referring to the term almost, the space between the piston sleeve and the actuator housing would be sufficient to slide the piston sleeve into the actuator housing in a manner that prevents hydraulic fluid from leaking distally to the piston sleeve when sealed. While not being bound to a particular theory, the distance could be from 1 mm to about 10 mm. Further, the outward wall of the piston sleeve or the inward wall of the actuator housing may have one or more grooves or indentations for receiving a seal such as an o-ring or a polypak seal. Still further, the wall portion of the piston sleeve may have a proximal den abutting a sleeve retaining ledge on the inward facing wall of the actuator housing.

In such embodiments, the top plug may be attached to the actuator housing by being threaded into the actuator housing with the inward wall of the actuator housing having a threaded portion adapted to receive an outwardly threaded portion of the top plug.

Alternatively the top plug may be bolted to the actuator housing. In certain embodiments, the top plug may have a plurality of vertical bores which align with a plurality of vertical threaded bores within the actuator housing. Bolts may pass through the plurality of vertical bores and be threaded into the vertical threaded bores within the actuator housing.

In other embodiments, the top plug is affixed to the actuator housing by horizontal bolts. In such embodiments, the top plug may fit within the inner wall of the actuator housing. The top plug may possess a plurality of horizontal threaded bores, likewise, the actuator housing may possess a plurality of horizontal bores so that the bolts may be inserted through the horizontal bores and be threaded into the horizontal threaded bores. Preferably, in such embodiments, distal or proximal to the horizontal threaded bores may be one or more grooves adapted to receive a seal such as an o-ring.

In further embodiments of the invention, regardless of the attachment method used to attach the top plug to the actuator housing, the top plug may be separated from the distal side of the piston sleeve and thereby form a first hydraulic chamber. Hydraulic fluid may enter the hydraulic piston chamber via at least one hydraulic fluid port running form the distal side of the piston sleeve to the proximal side of the piston sleeve. In this embodiment, the number and diameter of the hydraulic fluid port or ports can be optimized to reduce the flow of hydraulic fluid from the first hydraulic chamber to the hydraulic piston chamber in order to prevent slamming of the piston into the proximal side of the piston sleeve. Additionally such embodiments can provide a slower opening and closing of the gate valve which may be advantageous in certain applications.

In still another embodiment, the piston sleeve may not have a top area proximal to the piston sleeve wall, and may therefore be referred to as a topless piston sleeve. In such embodiments, in lieu of hydraulic fluid ports, the lack of a top area of the piston sleeve provides a single pressure chamber.

In any of the aforementioned embodiments, the proximal end of the wall portion of a piston sleeve may contact the distal portion of a sleeve retaining ledge to prevent proximal travel of the sleeve past a desired placement. Alternatively or additively, in some embodiments the sleeve may have an area on its outward facing wall that is threaded and designed to be received by reciprocal threading on the inward facing wall of the actuator housing. In such embodiments, both proximal and distal movements of the piston sleeve would be inhibited by this feature.

Still further, in embodiments of the invention regarding topless piston sleeves, the topless piston sleeves may be retained in relation to the actuator housing with a plurality of sleeve bolts through horizontal sleeve bores and entering threaded actuator housing bores adapted to receive the sleeve bolts. Preferably, the bolts and bores are positioned distal to the most distal portion of the distal side of the piston when unpressurized or proximal to the most proximal position of the proximal side of the piston when pressurized.

Further embodiments of the invention pertain to the interchangeability of different diameter pistons and corresponding piston sleeves having an inner diameter adapted to receive the piston. In general, the outer diameter of the piston sleeve is about the same as the inward facing wall of the actuator housing. In this aspect of the invention, the piston has an outward facing wall that is about the diameter of the inner diameter of the sleeve so as to be able to slide in a proximal to distal direction and vice versa relative to the sleeve.

In many embodiments, the piston may have one or more sealing grooves that circumscribe the piston and are adapted to receive o-rings and the like.

Alternatively, the inward facing wall of the piston sleeve may have one or more sealing grooves surrounding the piston which are adapted to receive seals such as o-rings and the like. It is envisioned that such grooves and seals on the piston or the piston sleeve may prevent loss of hydraulic fluid and pressure.

Further regarding the sleeve and piston combination, the piston diameter and sleeve inner diameter may be changed by removing and replacing the sleeve and piston with a new combination of the desired size without changing the entire actuator. In certain embodiments, the standard sizes may increase in 0.5 cm, 1 cm or 1 inch increments and the like based on piston diameter.

In implementation of one embodiment of the present invention, a top plug having vertical bolts is removed from the distal end of the actuator housing turning and removing the vertical bolts. Next, wherein a topless piston sleeve is not used, the sleeve may be removed by grasping and pulling on the top shaft of the piston if present or by pulling on the piston sleeve from the hydraulic fluid ports. In some instances, it may be desirable to insert a tool such as a screw driver or wrench into the hydraulic fluid ports to aid in pulling out the piston sleeve and the piston. Alternatively, in embodiments wherein there is threading on the outward facing wall of the piston sleeve adapted to be received by reciprocal threading on the inward facing wall of the actuator housing, the piston sleeve may be removed by unscrewing and then pulling the piston sleeve out of the actuator housing. Alternatively in embodiments wherein a topless piston is used, a spanner wrench or manual extraction may be used to remove the piston sleeve.

Once the piston and piston sleeve are removed, the new piston and piston sleeve may be inserted together into the actuator housing until the piston sleeve makes contact with the retainer ledge. In this implementation or method, the new piston sleeve will have the same outward diameter wherein the outward facing wall abuts or almost abuts the inward facing wall of the actuator housing. However, the new piston sleeve may have greater or lesser distance between its outward facing wall and its inward facing wall, such that the inner diameter of the piston sleeve is greater than or less than the previous piston sleeve. Consequently, the piston will have a corresponding outer diameter that is the same or about the same as the inner diameter of the piston sleeve. This allows for a larger or smaller piston to be used in an actuator depending on desired application without changing the actuator. In instances wherein a piston sleeve with a top is used, the piston may be inserted into the proximal end of the piston sleeve before inserting the piston and piston sleeve into the actuator housing. In instances wherein a topless piston sleeve is used. The piston may be inserted into the piston sleeve at the same time or a different time from the sleeve being inserted into the actuator housing.

In either type of piston sleeve, the user will push or otherwise insert the piston sleeve in a proximal direction until the proximal end of the piston sleeve abuts the retainer ledge, wherein proximal advancement will be stopped. At such time, the top plug can be inserted or otherwise placed in or on top of the distal end of the actuator housing. The top plug can be aligned such that the inlet port bore aligns with the hydraulic fluid port. This may be achieved by markings on the piston sleeve, actuator housing and top plug. Once the top plug is in the correct position, bolts can be inserted into the vertical bores and into the vertical threaded bores of the actuator housing, thus securing the top plug to the actuator housing.

Still further, in implementation of the present invention, hydraulic fluid is pumped into the inlet port, through the inlet port bore and into the hydraulic fluid port wherein the pressure fills the hydraulic piston chamber, forcing the piston in a proximal direction. The hydraulic fluid may come from an external hydraulic fluid pressure source. Upon pushing the piston in a proximal direction, the downstop is pushed in a proximal direction and the central spring is compressed. The operator shaft, which is in connection with the downstop is pushed in a proximal direction thus opening or closing a gate valve, depending on configuration. When the actuator is depressurized, the central spring forces the downstop and the operator shaft in a distal direction, thereby reversing the flow configuration of the gate valve from opened to closed or vice versa.

Referring to FIG. 1 is a cross sectional illustration of a hydraulic actuator 5 comprising a top plug 10 at the distal end of the actuator and having at least one outlet port 20 with a plug such as a pressure relief valve. The top plug also has an inlet port 30 for receiving a hydraulic fluid. The top plug has a proximal side comprising a top shaft bore 40 and at least one inlet port bore 50. The proximal side of the top plug 10 may abut the distal side of a piston sleeve 60. In such embodiments, the proximal side of the top plug 10 may possess one or more sealing grooves 65 which may contact the distal end of the piston sleeve. Within the sealing grooves are top plug seals 67, such as polypack seals or o-rings which prevent the escape of hydraulic fluid. The piston sleeve 60 possesses at least one hydraulic fluid port 70 running from the distal side of the piston sleeve to the proximal side of the piston sleeve to a hydraulic piston chamber 80. The hydraulic piston chamber 80 has a distal side comprising the proximal side of the piston sleeve and a proximal side comprising the distal side of the piston 85. The hydraulic piston chamber 80 also has a lateral side comprising the inward facing wall portion of the piston sleeve. As seen in FIG. 1, the piston sleeve 60 has a piston sleeve outward facing wall 90 abutting or almost abutting an inward facing wall of the actuator housing 100.

Regarding the attachment of the top plug to the distal end of the actuator housing, as seen in FIG. 1, the top plug may have a plurality of vertical bores 110 which align with a plurality of vertical threaded bores 120 within the actuator housing 100. Bolts 125 may pass through the plurality of vertical bores 110 and be threaded into the vertical threaded bores 120 within the actuator housing.

Figure 2:
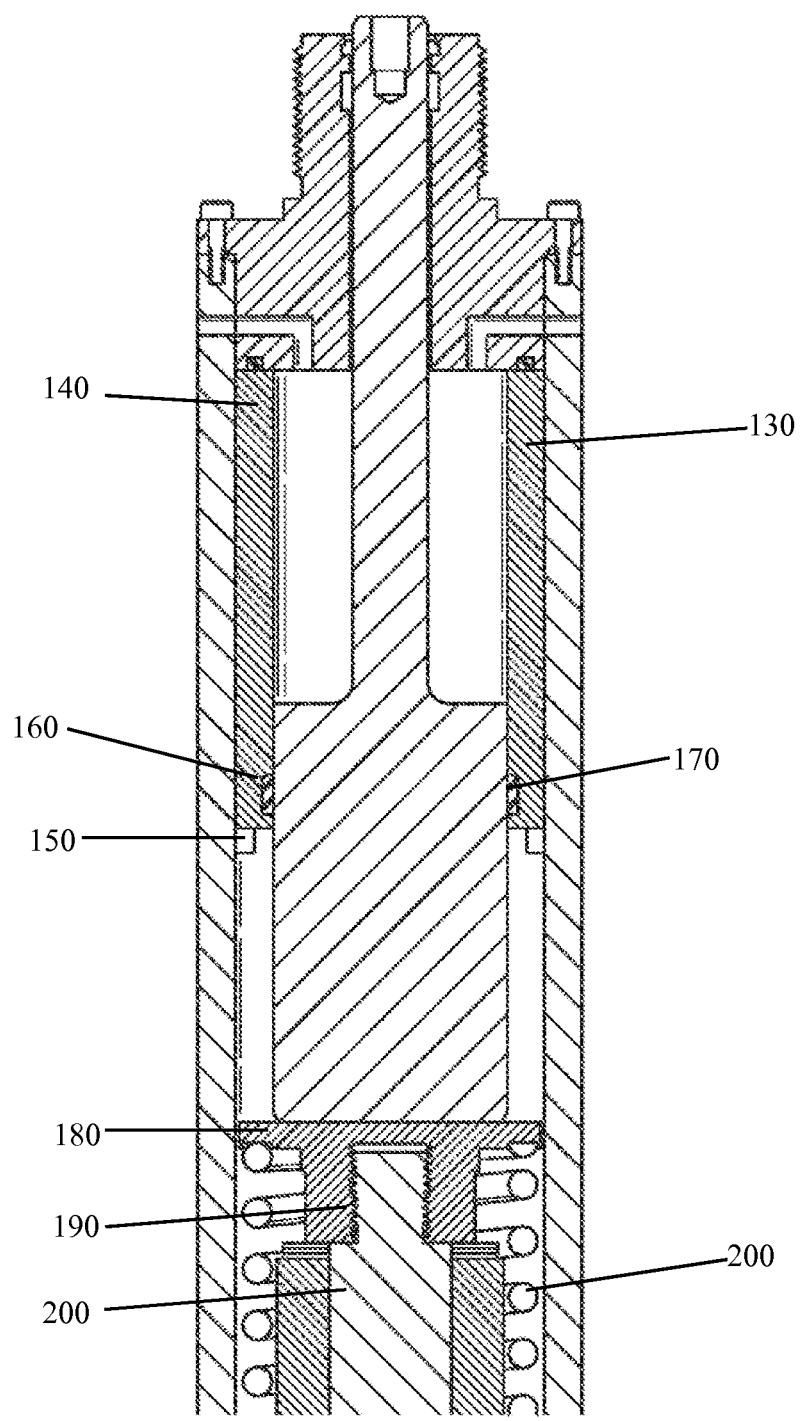
FIG. 2 is a cross sectional illustration of an actuator of the present invention comprising a topless piston sleeve.

FIG. 2 is a cross sectional illustration of another embodiment of a piston sleeve of the present invention. In this embodiment the piston sleeve may not have a top area proximal to the piston sleeve wall 130, and may therefore be referred to as a topless piston sleeve 140. In this embodiment, in lieu of hydraulic fluid ports, the lack of a top area of the piston sleeve provides a single pressure chamber.

As illustrated in either FIG. 1 or FIG. 2, the proximal end of the wall portion of a piston sleeve 60 or 140 may contact the distal portion of a sleeve retaining ledge 150 located on the inward facing wall of the actuator housing, to prevent proximal travel of the sleeve past a desired placement. Further as illustrated in either FIG. 1 or FIG. 2, proximal to the sleeve retaining ledge 150 may be one or more piston sleeve sealing grooves 160 which circumscribe the piston and are adapted to receive piston sleeve seals 170 such as o-rings and the like. Still further, as illustrated in FIG. 2, and as also seen in FIG. 1, the piston 85 has a proximal end. The proximal end of the piston is in contact with a downstop 180, which has a distal side and a proximal side as well as a centered threaded bore 190 adapted to receive an operator shaft 200. The distal end of the operator shaft is threaded into center threaded bore 190 of the downstop 180 located on the proximal side of the downstop 180. Further, regarding the proximal side of the downstop, 180, the central spring 210 circumscribes the operator shaft 200 and has a distal end which abuts the proximal end of the downstop 180 and a proximal end which abuts the bonnet ring 220 as seen in FIG. 3.

Figure 3:
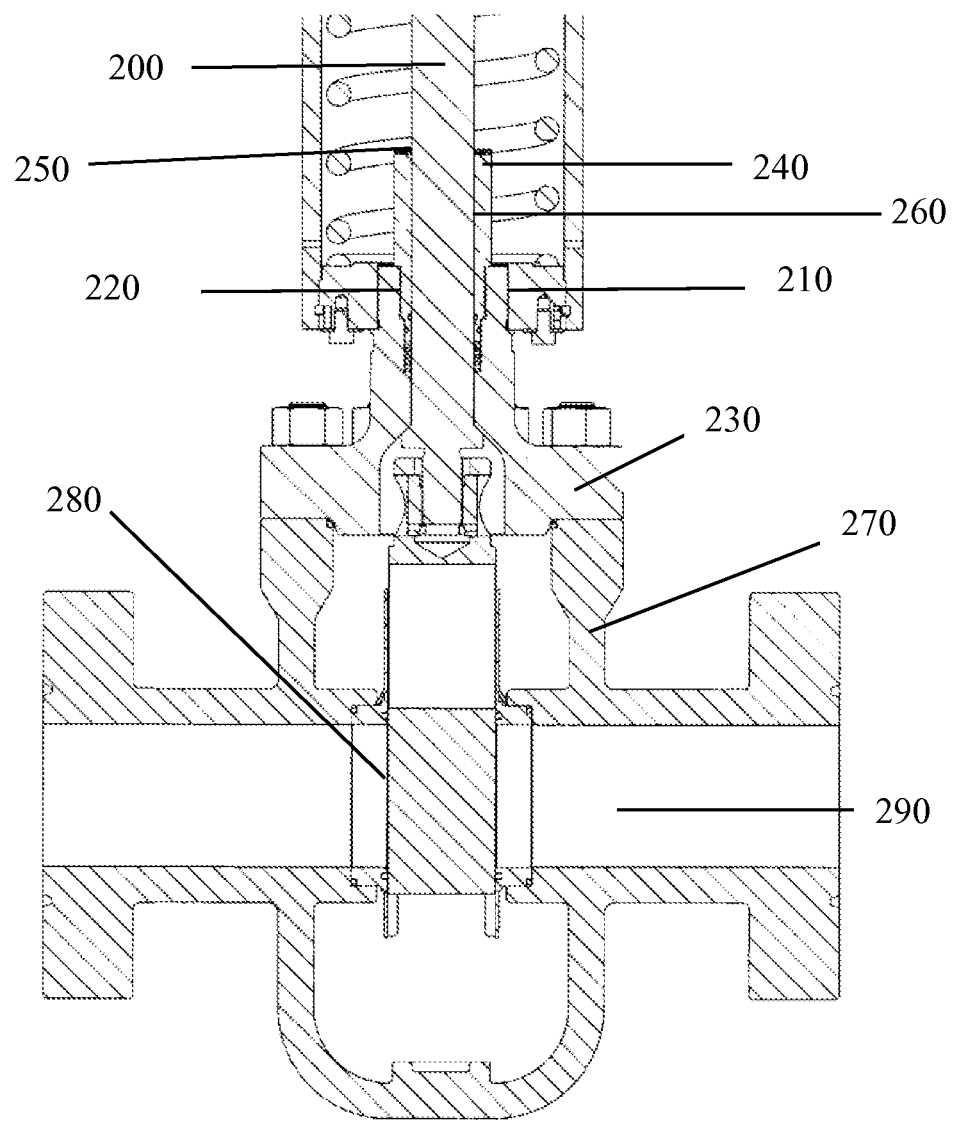
FIG. 3 is a cross sectional illustration of the lower or proximal end of a hydraulic piston actuator connected to a gate valve.

As seen from FIG. 3, which is a cross sectional illustration of the proximal end of a piston actuator and a valve body, the bonnet ring 220 connects the actuator housing 100 to the bonnet 230. Further, the bonnet ring as a bonnet ring central bore which is threaded onto the outward facing edge of the packing retainer 240. The distal end of the packing retainer is depicted having drift shims 250 which are used to adjust the stroke of the actuator. Further, the packing retainer 240 possesses a central packing retainer bore 260 through which the operator shaft 200 passes. The proximal end of the operator shaft thus passes through the packing retainer, past the bonnet ring 220, and the bonnet 230 and into the valve body 270 wherein it is connected to a gate 280 situated within the valve body, in order to open and close the gate and allow or prevent fluid flow from the flow axis 290 of the valve body, depending on whether the actuator is pressurized with hydraulic fluid as depicted in FIGS. 1 and 2, or unpressurized.

The invention claimed is:

1. A hydraulic actuator comprising:
    a. a top plug having at least one inlet port, the top plug having a proximal side with an inlet port bore in fluid connection with the inlet port, the top plug further defining a central axis in a distal to proximal direction and having at least one sealing groove on the proximal side of the top plug, a top plug seal being received in said groove;
    b. an actuator housing centered along the central axis and proximally connected to the top plug, the actuator housing having an inner diameter and an inward facing wall;
    c. a piston sleeve having a distal end and a proximal end, the piston sleeve further having an inner diameter and an inward facing wall and an outer diameter and an outer diameter and an outward facing wall, the outward facing wall abutting the inward facing wall of the actuator housing, the top plug seal abutting the distal end of the piston sleeve;
    d. a piston having a diameter an outward facing wall, a proximal side and a distal side, the outward facing wall abutting or about abutting the inward facing wall of the piston sleeve;
    e. a downstop having a distal side and a proximal side, the distal side abutting the proximal side of the piston and the proximal side abutting a central spring and connected to an operator shaft having a distal end and a proximal end;

wherein the piston sleeve is replaceable with a different piston sleeve having a different inner diameter and the piston is replaceable with a different piston having a different diameter, the outward facing wall of the different piston abutting the inward facing wall of the piston sleeve.

2. The hydraulic actuator of claim 1, wherein the top plug further comprises at least one inlet port for hydraulic fluid.

3. The hydraulic actuator of claim 1, wherein the distal end of the piston sleeve abuts the proximal side of the top plug.

4. The hydraulic actuator of claim 1, wherein the top plug and the piston sleeve are adapted to receive a top shaft, the top shaft having a proximal end connected to the distal side of the piston.

5. The hydraulic actuator of claim 1, wherein the proximal end of the piston sleeve abuts a retainer ledge.

6. The hydraulic actuator of claim 1, wherein hydraulic fluid entering the inlet port under pressure forms a hydraulic piston chamber that is proximal to the top plug and distal to the piston.

7. The hydraulic actuator of claim 1, wherein the top plug is affixed to the actuator by bolts.

8. The hydraulic actuator of claim 1, wherein there is a retainer ledge on said inward facing wall and the piston sleeve is retained from proximal movement by the retainer ledge and distal movement by the proximal side of the top plug.

9. The hydraulic actuator of claim 1, wherein the inlet port bore of the top plug is aligned with a hydraulic fluid port on the distal end of the piston sleeve.

10. The hydraulic actuator of claim 1, wherein the outer diameter of any piston sleeve is the same.

11. The hydraulic actuator of claim 1, wherein the inner diameter of the actuator housing remains constant regardless of piston sleeve selection.

* * * * *